United States Patent [19]
Itria

[11] 3,908,789
[45] Sept. 30, 1975

[54] METHODS FOR GENERATING AND SHAPING A SEISMIC ENERGY PULSE

[75] Inventor: Oswald Alfonso Itria, Bellaire, Tex.

[73] Assignee: Texaco Inc., New York, N.Y.

[22] Filed: Oct. 30, 1973

[21] Appl. No.: 411,102

Related U.S. Application Data

[63] Continuation-in-part of Ser. No. 239,530, March 30, 1972, abandoned.

[52] U.S. Cl. ............... 181/113; 181/115; 181/116
[51] Int. Cl.² ..................... G01V 1/10; G01V 1/08
[58] Field of Search ............ 181/.5 NC, .5 XC, 113, 181/115, 116, 118; 102/20, 27, 13

[56] References Cited
UNITED STATES PATENTS

| | | | |
|---|---|---|---|
| 2,609,885 | 9/1952 | Silverman | 181/116 |
| 2,771,961 | 11/1956 | Blake | 181/115 |
| 3,064,570 | 11/1962 | Smith | 181/.5 XC |
| 3,212,437 | 10/1965 | Saling | 181/116 |
| 3,323,611 | 6/1967 | Blayney | 181/.5 XC |
| 3,331,050 | 7/1967 | Kilmer et al. | 340/7 R |
| 3,493,074 | 2/1970 | Murray | 181/.5 XC |
| 3,656,585 | 4/1972 | Andrews | 181/.5 XC |

FOREIGN PATENTS OR APPLICATIONS

| | | | |
|---|---|---|---|
| 826,932 | 1/1960 | United Kingdom | 181/118 |

Primary Examiner—Maynard R. Wilbur
Assistant Examiner—H. A. Birmiel
Attorney, Agent, or Firm—T. H. Whaley; C.G. Ries; Theron H. Nichols

[57] ABSTRACT

In seismic delineation of sedimentary section below the surface of a seismic energy propagation medium, methods and articles for carrying out the methods are disclosed. A basic method for generating and shaping a seismic energy pulse comprises (1) generating a first energy pulse downwardly through the shortest distance to a point at the lower end of a vertical straight explosive material for forming a compressional forward portion of the seismic energy pulse, and (2) generating a second energy pulse later to form a rarefactional aft portion of the seismic energy pulse. By varying the length of the explosive material the lengths of the forward and aft portions are varied for controlling the shape of the seismic energy pulse, and by varying the position of the point of ignition of the linear explosive material, additional shaping of the seismic energy pulse results. A basic article for carrying out the above method comprises a vertical straight explosive material, as a straight piece of "Primacord," suspended at a desired predetermined depth, cut to a predetermined length, and detonated by a blasting cap at a predetermined position from the upper end to the lower end for producing a seismic energy pulse of the desired shape, a very thin elongated shape being preferable for attenuation of both the secondary bubble amplitude and time duration.

9 Claims, 6 Drawing Figures

METHODS FOR GENERATING AND SHAPING A SEISMIC ENERGY PULSE

Cross Reference To Related Application

This is a continuation-in-part of my patent application Ser. No. 239,530, filed Mar. 30, 1972 now abandoned.

BACKGROUND OF THE INVENTION

Broadly the present invention relates to seismic exploration and to an improved explosive marine seismic energy pulse generator for the introduction of seismic energy into water in a conventional shot hole filled with water, marshy areas, or particularly offshore from a floating vessel for supplying the explosive material and having a geophysical crew thereon for exploring earth layers and formations underlying land or bodies of water as oceans, seas, lakes, rivers, or the like. More particularly this invention pertains to a few methods for generating and shaping a seismic energy pulse resulting in attenuation and time delay of secondary pulses, and a few seismic energy generators for carrying out the above methods for generating and shaping the seismic energy pulse.

While the methods and apparatuses of the invention are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure or energy waves travel down through the water to the ocean floor and are reflected as in the usual echo-sounding techniques. However, these waves also penetrate into the ocean floor and are reflected from the sub-strata. These seismic acoustical waves also propagate horizontally through one or more geological strata and may be recorded at a distance from the source, thus providing useful refraction data on the stratum or strata involved.

Although conventional explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method and apparatuses for the present invention can be adjusted over a low amplitude range and adjusted in frequency so as to provide the desired spectrum distribution of sound frequencies for the purpose at hand.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In most methods utilized, it is customary to either position one or more detectors on the ground surface or tow them through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously wherein the explosions themselves tend to kill such marine life, an example being disclosed in U.S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective attenuation of the signals' secondary oscillations and by the effective use of the ghost, reflected, or rarefactional seismic energy pulses.

The use of explosive gas mixture solves some of the problems that arise with dynamite, since explosive gas mixtures do not kill as much marine life, a further example being disclosed in U.S. Pat. No. 3,620,327. Normally, gas mixtures can be stored as separate, non-explosive gases on the same vessel that contains the recording equipment. Thus, the need for an additional vessel or the possibility of killing marine life is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3–5 percent of the total electrical energy available in the capacitor bank is converted to useful acoustical energy in the water. Further many spark electrodes in parallel may be used simultaneously as disclosed in U.S. Pat. No. 3,613,823.

Well known methods to attenuate the pulsation of energy bubbles consist in using a metallic sphere which is provided with a plurality of holes regularly distributed on its wall and in which the explosion is carried out, this sphere being made of a material which can withstand the explosion, as disclosed in U.S. Pat. Nos. 2,877,859 and 3,525,416. While, however, it is difficult to build such spheres having a sufficient mechanical strength to withstand numerous repeated explosions, complete attenuation of bubble pulse amplitude is still lacking. Another known device comprises a container with a resilient opening and closing element which provides an intermittent connection of the interior of the container with the surrounding liquid medium, as disclosed in U.S. Pat. No. 3,444,953. None of the above systems completely attenuate the amplitude of bubble pulsation or oscillations.

While the use of "Primacord" is old when combined with a main charge of dynamite, as disclosed in U.S. Pat. No. 2,599,245, for creating a gas escape path for elimination of the bubble and its accompanying ghost pulse, but no means is disclosed for shaping the bubble pulse by using the reflected energy, as for generating an elongated seismic energy pulse at the lower end of the explosives, particularly by utilizing the ghost pulse.

A feature that is known about Primacords is that the distance between the primary pulse and the ghost pulse varies relative to the depth of the Primacord, from "Geophysics," October, 1953, No. 4, pages 793–804.

Further uses of Primacord as a powerful explosive are disclosed in U.S. Pat. Nos. 2,609,885 and 2,755,878 wherein the explosive is coiled or packed in tight helical coils to concentrate the effect of the Primacord to produce a greater pressure rise than TNT by "focusing." No straight lengths of Primacord are suggested herein, nor is the primary pulse strengthened by the reflected energy for pulse shaping disclosed.

While the use of dynamite is very restricted in offshore exploratory operations for preservation of the ecology, the restrictions on the utilization of Primacord, or the like, is much less, if any. Only the dynamite caps used to detonate the Primacord must be handled with caution, comparatively.

OBJECTS OF THE INVENTION

Accordingly, a primary object of this invention is to provide at least one method for generating and shaping a seismic energy pulse by using reflected energy.

Another object of this invention is to provide a method for attenuation of the amplitude secondary pulses resulting from a generated seismic primary energy pulse.

Another primary object of this invention is to provide several mechanisms for carrying out the method for generating and shaping a seismic energy pulse.

A further object of this invention is to provide a mechanism for shaping the desired seismic signal by utilizing a harmless amount of explosive material for attenuation of secondary pulses.

Another object of this invention is to attenuate the associated seismic bubble pulses and their detrimental effect to seismic exploration.

A still further object of this invention is to provide a seismic energy pulse generator including a submerged vertical straight explosive material of a predetermined length for shaping the primary pulse so that its dominate frequency will be lowered for placing more of the energy into the useful seismic frequency range which results in greater penetration of the seismic signal within the sedimentary section.

Another object of this invention is to provide a seismic energy pulse generator which is easy to operate, is of simple configuration, is economical to build and assemble, and is of greater efficiency for generating a primary pulse for greater penetration of the seismic signal within the sedimentary section.

Other objects and various advantages of the disclosed method and apparatus for generating and shaping a seismic energy pulse for attenuation of secondary pulses in offshore subsurface exploration will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, two forms or mechanisms for carrying out the method of the invention wherein like reference numerals have been employed to indicate similar parts in the several views in which.

DESCRIPTION OF THE INVENTION

Figure 1:
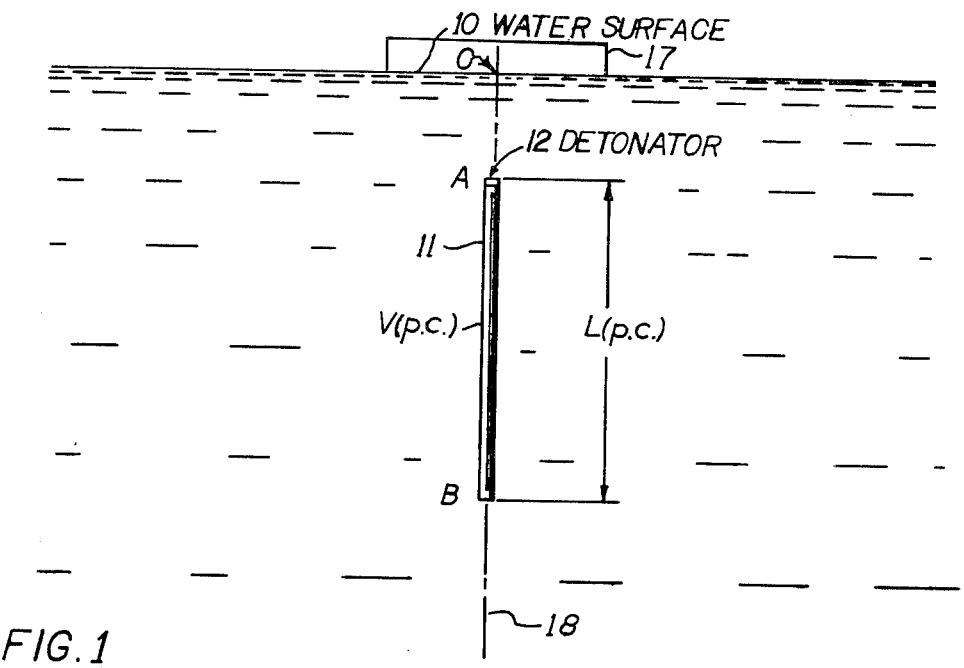
FIG. 1 is a schematic sectional view of a body of water with one embodiment of the new seismic energy pulse generator for attenuating secondary pulses submerged therein.

The invention disclosed herein, the scope of which being defined in the appended claims, is not limited in its application to the details of construction and arrangement of parts shown and described for carrying out the disclosed method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises, in seismic delineation of sedimentary section below the surface of a seismic energy propagation medium, a few methods for attenuating the amplitude and for changing the time duration of the bubble or secondary pulses resulting from a seismic energy pulse. This is accomplished by generating or shaping a seismic energy pulse to a thin elongated shape to provide a seismic pulse of maximum energy for arriving at the ocean floor for penetration thereof.

One method for generating and shaping a seismic energy pulse below the surface of a seismic energy propagation medium comprises, a. generating a first energy pulse downwardly through the immediate surrounding energy propagation medium to form a compressional forward portion of the seismic energy pulse at a submerged point, and b. generating a second energy pulse upwardly and then downwardly arriving later at the submerged point to form a rarefactional aft portion of the seismic energy pulse.

More methods of shaping the seismic energy pulse comprise the above combination of two steps, but with various modified first steps as, a. propagating an energy pulse downwardly in the immediate surrounding energy propagation medium by initiating detonation at the upper end of the vertical straight explosive material, by initiating detonation at the lower end of the vertical straight explosive material, or initiating detonation at any desired or predetermined position intermediate the ends of the explosive material for forming the compressional forward portion of the seismic energy pulse.

Another method comprises the combination of a modified first step as, a. detonating a vertical straight explosive material for generating a first energy pulse downwardly through the shortest distance to a point at the lower end of the explosive material for forming a compressional forward portion of the seismic energy pulse of a predetermined shape, and by the addition of a third step to the former two steps including, b. varying the length of the vertical straight explosive material for varying therewith both the compressional forward portion length and the rarefactional aft portion length for further shaping of the seismic energy pulse.

DESCRIPTION OF THE FIRST MODIFICATION OF THE SEISMIC ENERGY PULSE GENERATOR

FIG. 1 illustrates schematically a body of water in cross section having a surface 10 with one embodiment of a mechanism or seismic energy pulse generator 11 supported submerged therein for carrying out at least one of the methods of generating a seismic pulse of maximum energy for penetrating the ocean floor.

While the body of water may be merely water in a shot hole or bore hole for firing the seismic energy pulse generator therein at depths between 50 and 250 feet usually in surveying the land therearound, the water is illustrated as a larger body of water as a river, swamp, lake, sea, ocean, etc., where a seismic survey is desired of the bottom land or ocean floor below.

The seismic energy pulse generator 11 comprises a vertical straight explosive material, such as but not limited to Primacord, suspended at a predetermined depth under water by a float 17 or the like. A detonator comprising a conventional dynamite cap 12 is mounted on the upper end of the Primacord as illustrated in the embodiment of FIG. 1. The Primacord with points A and B being located at the extreme upper end lower ends, respectively, thereof having a predetermined length A B or L(pc) and having a longitudinal axis 18, is submerged below the surface at a predetermined depth A C with C being a point on the water surface directly above the vertical Primacord 11, the longitudinal axis CAB of the Primacord being vertical, and the Primacord is positioned in a seismic energy propagation medium, usually water, which has a velocity of sound propagation of substantially 5,000 feet per second for simplicity of calculation in the following examples.

An expanding bubble of gases is formed by an underwater detonation, which bubble is free to float in the water as it rises to the surface and is free to oscillate or pulsate, that is to first expand until the hydrostatic pressure externally of the bubble in the water finally overcomes the momentum of the outwardly flowing water and the bubble begins to contract until the pressure in the bubble becomes so great that it overcomes the hydrostatic pressure and momentum of the water and expands back out again. This expanding and contraction of the free bubble in the water causes the subsequent signal pulsation or oscillation and the detrimental pulses of sound therefrom which are most annoying and detrimental to the receipt of intelligible data from seismic recorders.

It has been discovered that if a spherically shaped bubble is flattened or elongaged so that the diameter or length of the major axis of the bubble is many times greater than the dimension of the bubble on the minor axis, the bubble will collapse with reduced force or impact and, as a result, the amplitude of the generated secondary bubble pulses or oscillation will be appreciably reduced. It is believed that this is because the bubble amplitudes are essentially in direct relationship to the smaller dimension of the bubble since the hydrostatic pressure on all surfaces of the bubble is, for all practical purposes, the same. Likewise, it is believed that as the period is shortened, the secondary pulses are substantially attenuated.

For generating a seismic energy pulse for traveling straight down through the water to the ground or ocean floor below to delineate the sedimentary section below, the strongest downwardly traveling seismic energy pulse is formed at the bottom of the vertical straight explosive material as indicated by reference point B on the Primacord 11, FIG. 1.

Figure 2:
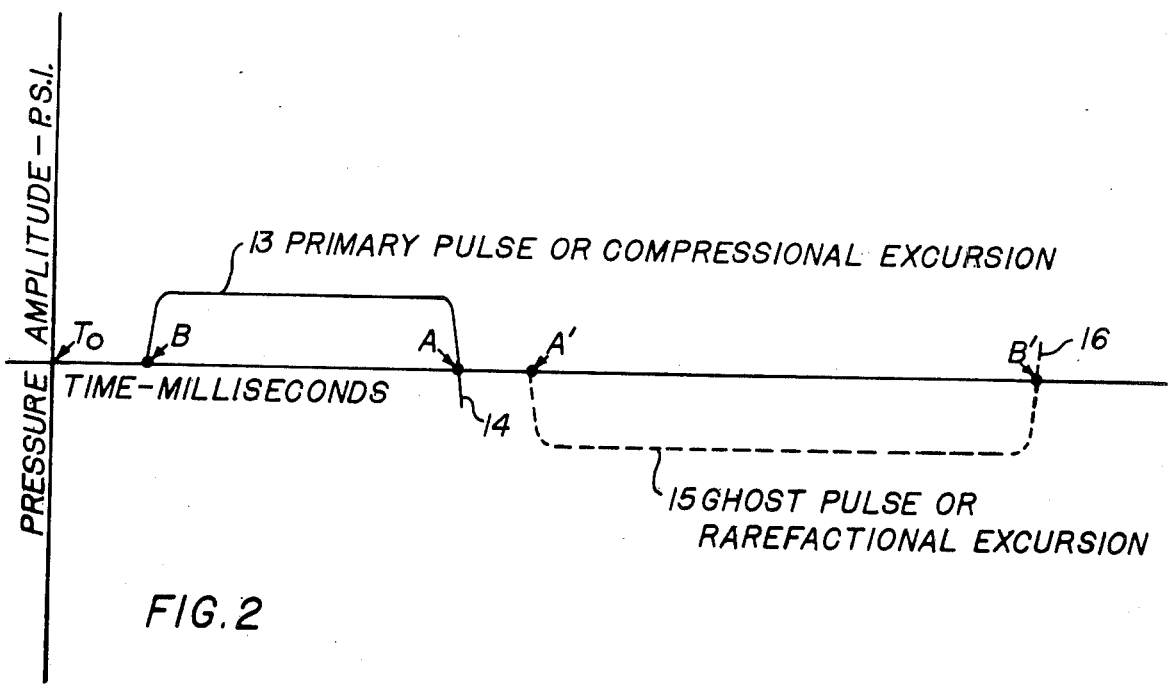
FIG. 2 is a pressure amplitude versus time set of typical curves for the fore and aft sections of a generated seismic energy pulse generated by the embodiment of FIG. 1.

This seismic energy pulse, illustrated on the pressure amplitude versus time curves of FIG. 2, comprises a forward or primary portion and an aft or ghost portion. The primary pulse is formed by a compressional excursion 13 having a time period of B A, and its rarefactional excursion 14 generated by the long piece of detonating Primacord. The rarefactional excursion 14 attenuates so rapidly, it is practially insignificant and accordingly not shown. As detonation is initiated at the upper end, point A, of the Primacord, FIG. 1, by the detonator 12 marking the time break T, the detonation proceeds downwardly for the full length of the vertical straight linear explosive material at the detonation velocity of substantially 22,000 feet per second. Of the energy transmitted to the immediate surrounding water from points A to B from the detonating Primacord, the portion thereof which travels straight down through the Primacord at substantially 22,000 feet per second forms the forward portion of the seismic energy pulse at point B. The portion of the energy radiating or traveling straight up from the vertical explosive material through the water to the surface and reflecting straight back down through the longer path, arrives later at point B to generate the ghost or rarefactional excursion 15 and its compressional excursion 16 which forms the aft portion of the seismic energy pulse illustrated on FIG. 2. Likewise, the compressional excursion 16 attenuates so rapidly, it is practically insignificant and accordingly not shown. For the sake of simplicity and clarity of disclosure, only the first excursions 14 and 16 of each pulse are illustrated.

The points A and B illustrate the points in time on the pressure amplitude versus time curves of FIG. 2 when the sound from the respective points A, B, FIG. 1, on the vertical straight explosive material 11 arrives through the water at the bottom of the explosive material relative to the instant $T_o$, FIG. 2, of detonation of the detonator. Points A' and B' on FIG. 2 illustrate the points in time when the sound from the respective points A, B, FIG. 1, travel up to the surface and reflect back down to arrive at bottom point B relative to the instant $T_o$, FIG. 2.

TYPICAL EXAMPLE OF FIRST EMBODIMENT

Portions of this seismic energy pulse may be calculated as follows:

The pulse time lag is the period of time from the instant $T_o$, FIG. 2, of detonation of the cap 12, FIG. 1, until the instant B, FIG. 2, that the first sound of the first part or bottom of the detonating Primacord arrives at the bottom of the explosive material, point B, to commence the downward seismic energy pulse towards the ocean floor.

Where AB or Lpc is the length of the Primacord, Vpc is the detonation velocity through the Primacord, which is substantially 22,000 feet per second, and A B is 220 feet, for example, $$\text{Pulse Time Lag} = \frac{Lpc}{Vpc} = \frac{AB}{Vpc} = \frac{220}{22,000} = .010 \text{ seconds}$$

Where Vw = 5,000 feet per second, substantially the velocity of sound through water, Primary Pulse or Compressional Excursion Duration = B A $$(\text{FIG. 2}) = \frac{Lpc}{Vw} - \frac{Lpc}{Vpc} = \frac{AB}{Vw} - \frac{AB}{Vpc} = \frac{220}{5,000} - \frac{220}{22,000} = .034 \text{ sec.}$$

$$.044 - .010 = .034 \text{ sec.}$$

Where the Primacord is submerged to a depth of 20 feet below the surface, A C, for example, is the distance from the top point A of the Primacord to the point C directly above on the water surface.

An equation to determine the onset time of A' of the ghost pulse after time break $T_o$ is:

$$T_{A'} = \frac{2AC + AB}{Vw} = \frac{40 + 220}{5,000} = .052 \text{ seconds}$$

The time lag or duration A—A' between the end of the primary pulse or compressional excursion and the beginning of the ghost pulse or rarefactional excursion $$= \frac{2AC}{Vw} = \frac{2 \times 20}{5,000} = .008 \text{ seconds.}$$

Also, the time of arrival of B' after time break $T_o$ is:

$$T_{B'} = \frac{AB}{Vpc} + \frac{BA + AC + CA + AB}{Vw} = \frac{AB}{Vpc} + \frac{2AB + 2AC}{Vw} = .010 + .096 = .106 \text{ seconds}$$

Therefore, the ghost pulse = $T_{B'} - T_{A'}$ = 0.106 − 0.052 = 0.054 seconds.

Another method of calculating the time duration of the ghost pulse or rarefactional excursion is $$A'B' = T_{B'} - T_{A'} = T_{ghost} = \left(\frac{AB}{Vpc} + \frac{BA + AC + CA + AB}{Vw}\right) - \left(\frac{AC + CA + AB}{Vw}\right) = \frac{AB}{Vpc} + \frac{AB}{Vw} = \frac{220}{22,000} + \frac{220}{5,000} = .054$$

Thus the compressional excursion 13 and a part of its rarefactional excursion 14 form the forward portion of the seismic energy pulse and the ghost or rarefactional excursion 15 and its compressional excursion 16 form the aft portion of the seismic energy pulse.

In addition, it may be seen how the shape of the resulting or generated seismic energy pulse may be varied by varying the individual lengths of the forward and aft portions thereof.

By varying the length of the vertical straight linear explosive material 11, the shape of the resulting seismic energy pulse is varied, the longer explosive material provides lengthening of the seismic energy pulse.

Varying of the depth A C of the explosive material 11 varies the time delay between the onsets of the compressional forward portion and the rarefactional aft portion for providing further shaping of the seismic energy pulse, the deeper the depth, the greater the time duration of the composited primary-ghost pulse or seismic energy pulse.

In actual operation, as the Primacord burns progressively from the detonator 12 to the far end, nothing is left of the Primacord but a minute bit of ash, if any, which mixes or dissipates in the water, leaving no second medium for more sound waves to travel in that would disturb to any great extent the original compressional and rarefactional portions of the seismic energy pulse formed at the bottom of the Primacord.

Likewise, by varying the position of the detonator 12 or point of ignition of the linear explosive material 11 from one end to the other end, additional shaping of the seismic energy pulse results. As is seen from the formulas above, that would vary the position and the length of the ghost pulse relative to the primary pulse, the lower the detonator is placed on the vertical straight linear explosive material, the shorter is the ghost pulse relative to the primary pulse.

SECOND EMBODIMENT

Figure 3:
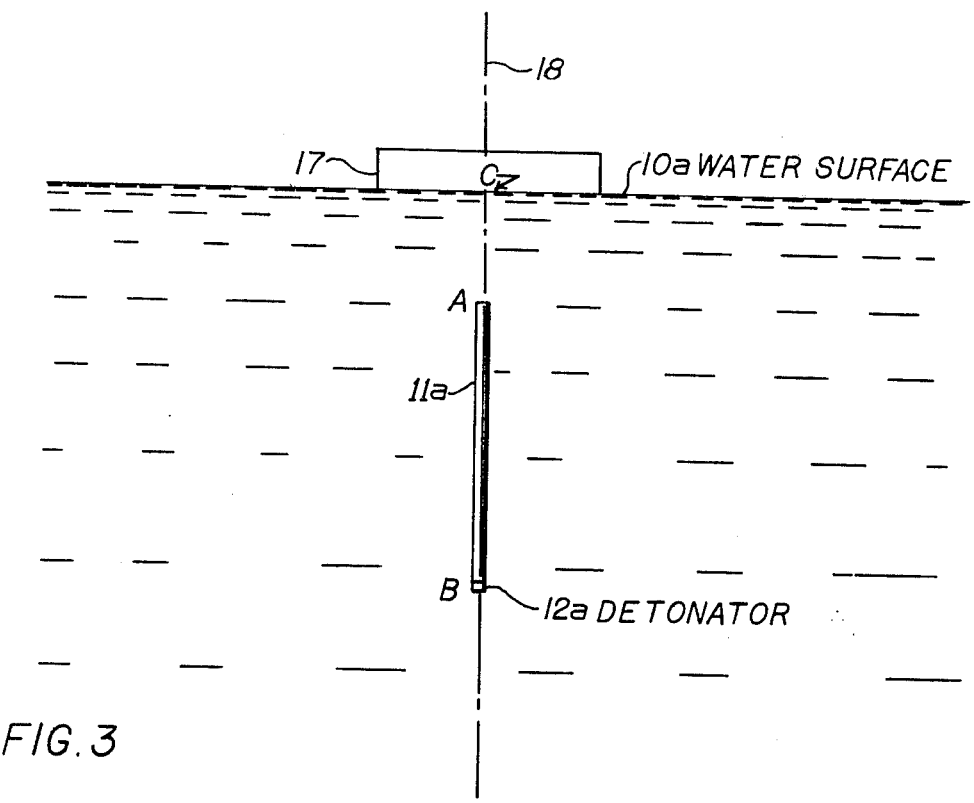
FIG. 3 is a modification of the embodiment of FIG. 1.
Figure 4:
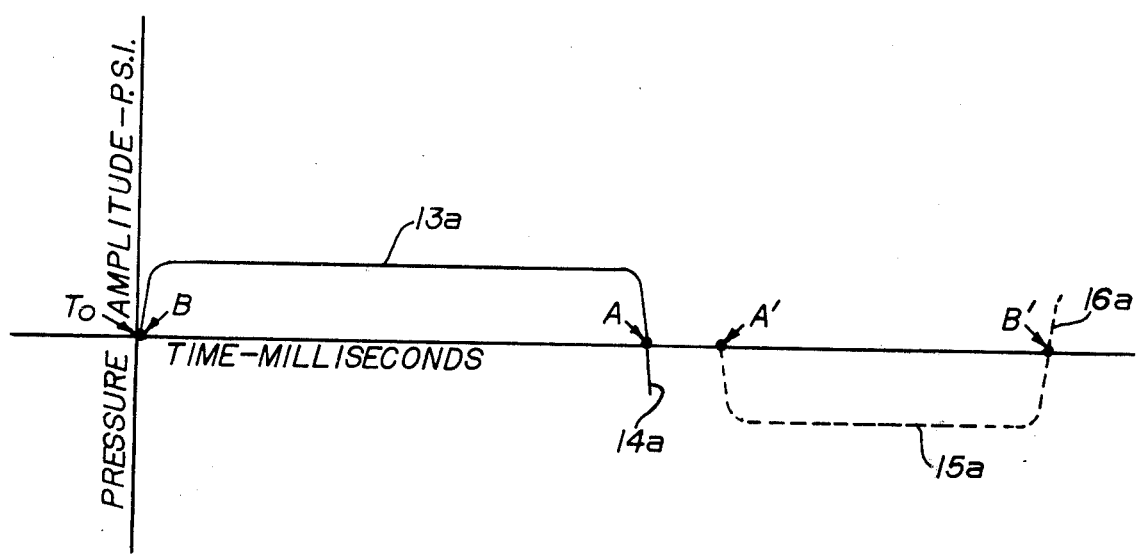
FIG. 4 is another pressure amplitude versus time set of curves of the fore and aft sections of a generated seismic energy pulse generated by the embodiment of FIG. 3.

FIGS. 3 and 4 illustrate schematically a second seismic energy pulse generator 11a submerged at or below the water surface 10 for carrying out at least one of the above disclosed methods for generating and shaping a seismic energy pulse at the bottom of the Primacord 11a at point B.

The points $T_o$ and A illustrate the points in time on the pressure amplitude versus time curves of FIG. 4 when the sound from the respective points B, A, FIG. 3, on the vertical straight explosive material 11a arrives through the water at the bottom of the explosive material relative to the instant $T_o$, FIG. 4, of detonation of the detonator. Points $T_o$ and B are on the same point. Points A' and B', FIG. 4, illustrate the points in time when the sound from the respective points A, B, FIG. 3, travel up through the water to the surface and reflect back down to arrive at bottom point B as point B' relative to the instant $T_o$, FIG. 4.

This generator 11a comprises a vertical straight explosive material, such as but not limited to Primacord of a predetermined length A B suspended below the surface of the water at a predetermined depth A C on its vertical longitudinal axis C A B, with a deontator 12a, as a conventional dynamite cap secured to the lower end of the explosive material. Here likewise, a seismic energy pulse is formed at the bottom of the Primacord for traveling straight down through the water to the ground below to delineate the sedimentary section below.

In operation, upon firing of the detonator 12a FIG. 3, the lower end of the Primacord is ignited to instantly start the forming of the forward portion or primary pulse compressional excursion 13a FIG. 4, of the seismic energy pulse at time break $T_o$. As the Primacord burns upwardly at the rate of substantially 22,000 feet per second, the sound generated in the immediate surrounding water travels in all directions at 5,000 feet per second, that portion traveling straight down forms the primary pulse compressional excursion 13a. That portion of the sound of the burning or exploding Primacord that travels staight up, reflects off the surface at point C and returns straight down to point B of the generator 11a after traveling the longer route to form later the ghost pulse or rarefactional excursion 15a and its compressional excursion 16a at the end of the primary pulse compressional excursion 13a and a portion of its rarefactional excursion 14a to accordingly form the complete long time duration composite primary-rarefactional seismic energy pulse. Both excursions 14a and 16a attenuate so rapidly that they are practically insignificant and accordingly not shown. For the sake of simplicity and clarity of disclosure, only the first rarefactional excursion 14a and first compressional excursion 16a of each pulse are illustrated.

TYPICAL EXAMPLE OF SECOND EMBODIMENT

The shape of the seismic energy pulse of FIG. 4 may be calculated as follows:
Where:

A B = Primacord length = 220 feet, for example.
Vpc = 22,000 feet per second = detonation velocity.
Vw = 5,000 feet per second = velocity of sound in water.
A C = 20 feet depth below point C on surface.

Duration of Primary Pulse Compressional Excursion =

$$\frac{BA}{Vpc} + \frac{AB}{Vw} = \frac{220}{22,000} + \frac{220}{5,000} = .054 \text{ seconds}.$$

The time separation between the zero amplitude crossing of the positive excursion of the primary pulse compressional excursion and the onset of the ghost or rarefactional excursion is $$T_s = A - A' = \frac{2\,A\,C}{Vw} = \frac{40}{5,000} = .008 \text{ seconds}.$$

Time duration of ghost pulse or rarefactional excursion $$= T_{A'B'} = \frac{AB}{Vw} - \frac{AB}{Vpc} =$$

$$\frac{220}{5,000} - \frac{220}{22,000} = .034 \text{ seconds}.$$

Thus it may be seen that the primary pulse compressional excursion 13a or forward portion of the resultant seismic energy pulse is elongated to its maximum length for the disclosed example and, for that particular depth A C, the rarefactional excursion 15a is shaped to its minimum length to provide the other extreme shape from the above first embodiment for a particular depth A C and length A B of explosive material.

Similar to the first embodiment, the shape of this second embodiment may be varied further by varying the length A B of the Primacord, and the depth A C of the Primacord, and the position of the detonator 12a on the Primacord.

THIRD EMBODIMENT

Figure 5:
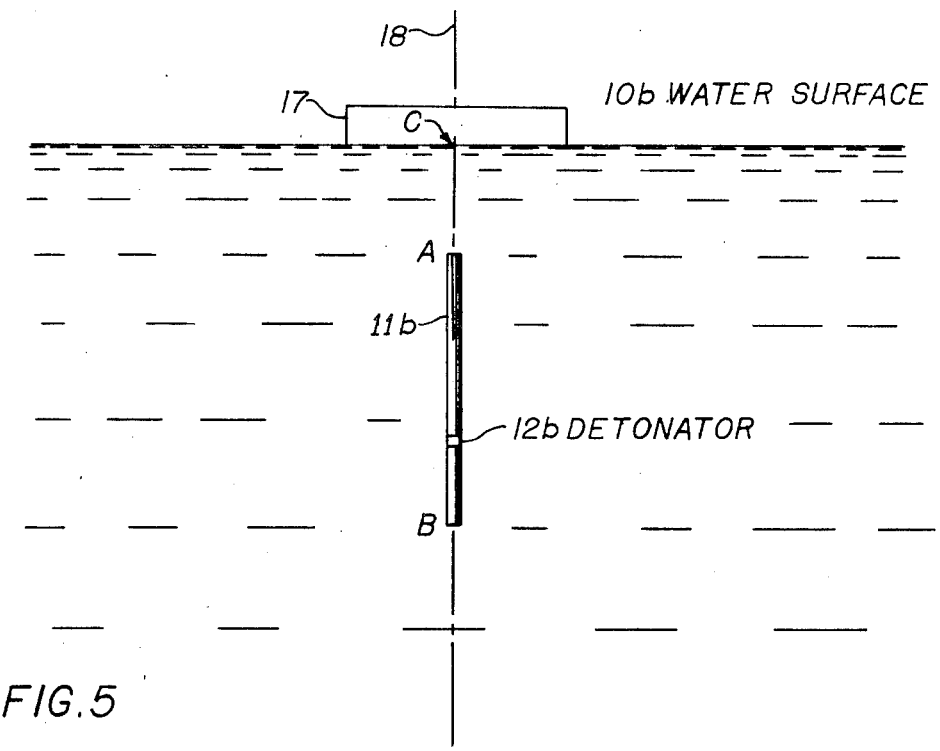
FIG. 5 is another modification of the embodiment of FIG. 1.
Figure 6:
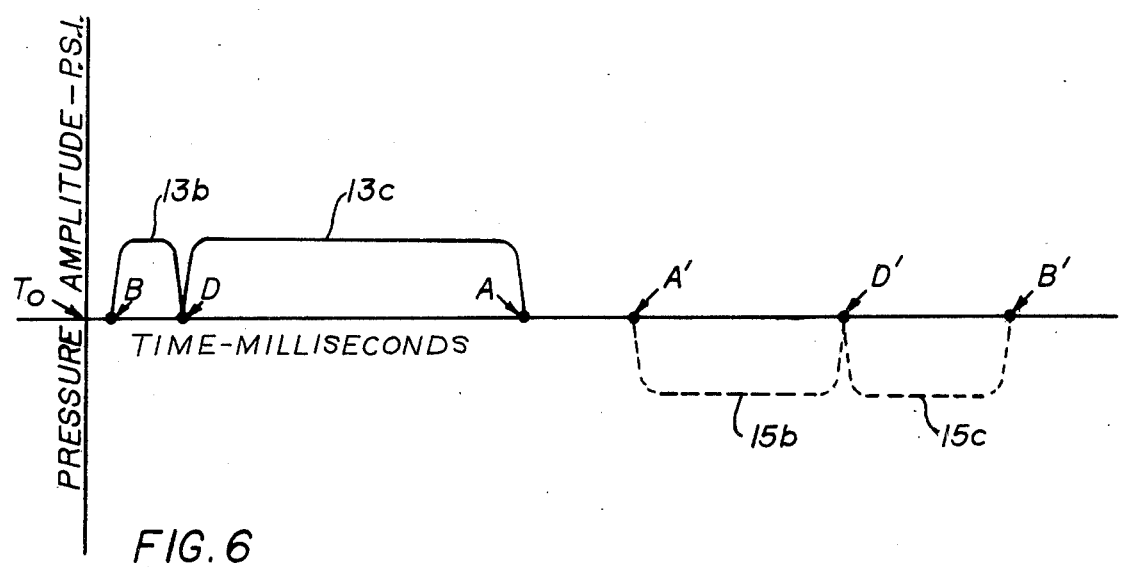
FIG. 6 is the pressure amplitude versus time set of curves of the fore and aft sections of a generated seismic pulse generated by the embodiment of FIG. 5.

A third seismic energy pulse generator 11b is illustrated schematically in FIG. 5 with its generated and shaped seismic energy pulse shown in FIG. 6, for carrying out one of the above disclosed methods. This generator 11b comprises a vertical straight linear explosive material, such as but not limited to Primacord of a predetermined length A B suspended below the surface 10b, FIG. 5, of the seismic energy propagation medium at a predetermined depth A C, similar to the above two embodiments, but with a detonator 12b, as a conventional dynamite cap positioned at any predetermined point D, FIG. 6, between the upper and lower ends, A and B, respectively, of the Primacord. The longitudinal axis C A B of the Primacord is vertical. The last feature provides the greatest variation in shape of this third embodiment over each of the other two for a particular length A B and depth A C of the Primacord.

The points A, D, and B illustrate the points in time on the pressure amplitude versus time curves of FIG. 6 when the sound from the respective points A, 12b, and B on the vertical straight explosive material 11b, FIG. 5, arrive through the water at the bottom of the explosive material relative to the instant $T_o$, FIG. 6, of detonation of the detonator. Points A', D', and B', FIG. 6, illustrate the points in time when the sound from the respective points A, 12b, and B, travel up through the water to the surface and reflect back down to arrive at bottom point B relative to the instant $T_o$, FIG. 6.

TYPICAL EXAMPLE OF THIRD EMBODIMENT

The seismic energy pulse shape of the above described third embodiment 11b is formed by adding two primary pulses 13b and 13c and two ghost pulses 15b and 15c generated by this embodiment whereby the resultant pulse is the algebraic summation of these four pulses. Further the shape may be varied as seen from the following calculations of an example:

Where:
 A B = Primacord length = 220 feet, for example.
 Vpc = 22,000 feet per second = detonation velocity
 Vw = 5,000 feet per second = velocity of sound in water.
 A C = 20 feet depth below point C on the surface.
 D = Detonator, identified as 12b on FIG. 5.
 D A = 150'
 D B = 70'

Pulses from generator portion D B:

Primary Pulse Compressional Excursion

Onset time of arrival after time break $T_o$ is $T_B$, which is the time from the instant of detonation $T_o$ shown on FIG. 6 until the instant B that the sound of detonation at point B, FIG. 5 occurs on the vertical straight explosive material 11b, which $$= \frac{DB}{Vpc} = \frac{70'}{22,000} = .003 \text{ seconds.}$$

$$\text{Duration } 13b = T_{D\,B} = \frac{DB}{Vw} - \frac{DB}{Vpc} =$$

$$\frac{70'}{5,000} - \frac{70'}{22,000} = .011 \text{ seconds.}$$

Ghost Pulse or Rarefactional Excursion

Onset time D' of ghost pulse, measured from $T_o$ is $T_{D'}$ which is the time from the instant of detonation $T_o$ shown on FIG. 6 until the instant D' that the sound of detonation at point 12b, FIG. 5, travels through the water up to the surface and back down to arrive at point B, FIG. 5, on the vertical straight explosive material 11b, which $$= \frac{DA + 2AC + AB}{Vw} = \frac{410'}{5,000} = .082 \text{ seconds.}$$

$$\text{Duration } 15c = T_{D'\,B'} = \frac{DB}{Vw} +$$

$$\frac{DB}{Vpc} = \frac{70'}{5,000} + \frac{70'}{22,000} = .017 \text{ seconds.}$$

Pulses from generator portion D A:

Primary Pulse Compressional Excursion

Onset time of arrival after time break $T_o$ is $T_D$, which is the time from the instant of detonation $T_o$ shown on FIG. 6 until the instant D that the sound of detonation at point D, FIG. 5, arrives through the water at point B, FIG. 5, on the vertical straight explosive material 11b, which $$= \frac{DB}{Vw} = \frac{70'}{5,000} = .014 \text{ seconds.}$$

$$\text{Duration } 13c = T_{D\,A} = \frac{DA}{Vw} +$$

$$\frac{DA}{Vpc} = \frac{150'}{5,000} + \frac{150'}{22,000} = .037 \text{ seconds.}$$

Ghost Pulse or Rarefactional Excursion

Onset time A' of ghost pulse measured $T_o$ is $T_{A'}$, which is the time from the instant of detonation $T_o$ shown on FIG. 6 until the instant A' that the sound of detonation at point A, FIG. 5, travels through the water up to the surface and back down to arrive at bottom point B, which $$= \frac{DA}{Vpc} + \frac{2AC + AB}{Vw} = \frac{150'}{22,000} +$$

$$\frac{260}{5,000} = .059 \text{ seconds.} \quad \text{Duration}$$

$$15b = T_{A'\,D'} = \frac{DA}{Vw} - \frac{DA}{Vpc} =$$

$$\frac{150'}{5,000} - \frac{150'}{22,000} = .023 \text{ seconds.}$$

Onset time D' of ghost pulse measured $T_o$ is $T_{D'}$, which is the time from the instant of detonation $T_o$ shown on FIG. 6 until the instant D' that the sound of detonation at point 12b, FIG. 5, travels through the water up to the surface and back down to arrive at bottom point B, which $$= \frac{DA + 2AC + AB}{V_w} =$$

$$\frac{150' + 40' + 220'}{5,000} = .082 \text{ seconds.}$$

Accordingly, it is seen that the third embodiment 11b of the invention generates and shapes a seismic energy pulse that may vary in length and shape in the complete range from the embodiment 11 of FIGS. 1 and 2 to the embodiment 11a of FIGS. 3 and 4 as extreme limits.

The shape of the seismic energy pulse may be varied further likewise by varying the length A B of the vertical straight explosive material, by varying the depth A C of the explosive material below the surface of the seismic energy propagation medium, and by varying the position of the detonator 12b on the linear explosive material.

Accordingly, it will be seen that the disclosed methods and seismic energy pulse generators for carrying out the methods with attenuation of secondary bubble pulses operate in a manner which meets each of the objects set forth hereinbefore by reducing the magnitude of the secondary bubble pulses and oscillations by generating elongated bubbles.

While a few methods of the invention and a few mechanisms for carrying out the methods have been disclosed, it will be evident that various other methods and modifications are possible in the arrangement and construction of the disclosed methods and apparatuses for generating and shaping a seismic energy pulse for attenuation of secondary oscillation without departing from the scope of the invention and it is accordingly desired to comprehend within the purview of this invention such modifications as may be considered to fall within the scope of the appended claims.

I claim:

1. In seismic delineation of sedimentary section below the surface of a seismic energy propagation medium, a method for shaping a seismic energy pulse comprising the steps of,
   a. generating a first energy pulse at a predetermined distance below the surface of the seismic energy propagation medium downwardly through the immediate surrounding energy propagation medium to form a compressional forward portion of the seismic energy pulse at a submerged point, and
   b. simultaneously generating a second energy pulse upwardly which arrives later at the submerged point to form a rarefactional aft portion of the seismic energy pulse.

2. In seismic delineation of sedimentary section below the surface of a seismic energy propagation medium, a method for shaping a seismic energy pulse comprising the steps of,
   a. propagating a first energy pulse downwardly through the immediate surrounding energy propagation medium by detonating a vertical straight explosive material of a predetermined length positioned at a predetermined depth to a point at the lower end of the linear explosive material to form a compressional forward portion of the seismic energy pulse, and
   b. simultaneously propagating a second energy pulse in an opposite direction from the first energy pulse through the immediate surrounding energy propagation medium to the surface of the medium and back to said point through the longer distance arriving later to form a rarefractional aft portion of the seismic energy pulse.

3. A method as recited in claim 1 including the additional step of,
   a. varying the length of the vertical straight explosive material for varying therewith both the compressional forward portion length and the rarefactional aft portion length for further shaping of the seismic energy pulse.

4. A method as recited in claim 2 wherein the first step comprises,
   a. propagating an energy pulse downwardly in the immediate surrounding energy propagation medium by initiating detonation at the upper end of the vertical straight explosive material for forming the compressional forward portion of the seismic energy pulse.

5. A method as recited in claim 2 wherein the first step comprises,
   a. propagating an energy pulse downwardly by initiating detonation at the lower end of the vertical straight explosive material for forming the compressional forward portion of the seismic energy pulse.

6. A method as recited in claim 2 wherein the first step comprises,
   a. propagating an energy pulse downwardly by initiating detonation intermediate the ends of the vertical straight explosive material for forming the compressional forward portion of the seismic energy pulse.

7. In seismic delineation of a sedimentary section below the surface of a body of water, a method for shaping a seismic energy pulse comprising the steps of,
   a. generating a compressional forward portion of the seismic pulse by detonating a vertical straight explosive material at a predetermined depth for simultaneously causing a first energy pulse to traverse down the length of the linear explosive material in the immediate surrounding water to a point at the end of the linear explosive material, and
   b. generating a rarefactional aft portion of the seismic pulse by simultaneously initiating a second energy pulse to traverse in an opposite direction from the first energy pulse through the immediate surrounding body of water to the surface and back to said point through the longer distance arriving later to form the rarefactional aft portion of the seismic energy pulse.

8. In seismic delineation of sedimentary section below the surface of a body of water, a method for generating a seismic energy pulse comprising the steps of,
   a. transmitting a first energy pulse down the length of a detonating vertical straight explosive material through the shortest distance to a point at the end of the linear explosive material for forming a compressional forward portion of the seismic energy pulse, and b. simultaneously transmitting a second energy pulse in an opposite direction from the first energy pulse through the immediate surrounding body of water to the surface and back to said point through the longer distance arriving later for forming a rarefactional aft portion of the seismic energy pulse.

9. In seismic delineation of sedimentary section below the surface of a body of water, a method for forming a seismic energy pulse comprising the steps of, a. forming a compressional forward portion of the seismic energy pulse to a predetermined length by generating a first energy pulse down a predetermined length of a detonating explosive material in the body of water through the shortest distance to a point at the lower end of the explosive material, and b. forming a rarefactional aft portion of the seismic energy pulse to a predetermined length by simultaneously generating a second energy pulse in the body of water upwardly a predetermined distance from the first energy pulse to the surface and back to said point through a longer distance arriving later to form the rarefactional aft portion of the seismic energy pulse.

* * * * *